United States Patent [19]

Takahashi et al.

[11] Patent Number: 5,290,048
[45] Date of Patent: Mar. 1, 1994

[54] WORKING FLUID CIRCUIT FOR ACTIVE SUSPENSION CONTROL SYSTEM OF VEHICLE

[75] Inventors: Kenro Takahashi; Tadashi Yamashita, both of Kanagawa, Japan

[73] Assignee: Nissan Motor Co., Ltd., Yokohama, Japan

[21] Appl. No.: 46,882

[22] Filed: Apr. 15, 1993

Related U.S. Application Data

[63] Continuation of Ser. No. 787,868, Nov. 5, 1991, abandoned.

[30] Foreign Application Priority Data

Nov. 9, 1990 [JP] Japan ................... 2-305702

[51] Int. Cl.⁵ .................... B60G 21/06; B60G 17.015
[52] U.S. Cl. ..................... 280/6.12; 280/714
[58] Field of Search ............. 280/707, 714, 6.12, 280/689, 772

[56] References Cited

FOREIGN PATENT DOCUMENTS

| | | | |
|---|---|---|---|
| 318932 | 6/1989 | European Pat. Off. | 280/707 |
| 62-213513 | 10/1985 | Japan | 280/707 |
| 62-15107 | 1/1987 | Japan | 280/707 |
| 62-295714 | 12/1987 | Japan | |
| 63-20207 | 1/1988 | Japan | 280/714 |

Primary Examiner—Karin L. Tyson
Attorney, Agent, or Firm—Lowe, Price, LeBlanc & Becker

[57] ABSTRACT

A working fluid circuit for an active suspension control system for an automotive vehicle comprises a pressure source unit which provides pressurized working fluid to actuators, associated with wheels respectively, which are operable to suppress attitude change of a vehicle body, pressure control valves associated with the actuators respectively, and check valves located in a by-pass from an output port to a supply port of the pressure control valve, the supply port communicating with the pressure source through a supply line to which the working fluid is supplied from the pressure source, the output port communicating with the actuator through an output line for outputting the working fluid adjusted at a preselected controlled level to the actuator. Each of the check valves is responsive to pressure of the working fluid in the output line which is greater than that in the supply line for feeding back the working fluid in the output line to the supply line for providing a part of pressure supplied to said pressure control valve.

5 Claims, 5 Drawing Sheets

WORKING FLUID CIRCUIT FOR ACTIVE SUSPENSION CONTROL SYSTEM OF VEHICLE

This application is a continuation of application Ser. No. 07/787,868 filed Nov. 5, 1991 now abandoned.

BACKGROUND OF THE INVENTION

1. Field of the Invention

The present invention relates generally to an active suspension control system for an automotive vehicle. More specifically, the invention relates to an improved working fluid circuit for an active suspension control system which is operable to provide control pressure effectively with reduced consumption of energy.

2. Description of the Background Art

Japanese Patent First Publication No. 62-295714 discloses an active suspension control system for an automotive vehicle. This system includes working cylinders each disposed between a vehicle body and a wheel, pressure control valves responsive to command signals to control working fluid pressure to be supplied to the working cylinders respectively, means for detecting or projecting a lateral acceleration acting on the vehicle body, and a controller responsive to a signal indicative of a lateral acceleration value to calculate command signals to the pressure control valves. The controller is operable to multiply the lateral acceleration value by control gains to provide the command signals which serve to suppress rolling motion of the vehicle.

In such a conventional system, working fluid at high pressure must be always supplied to a supply port of a pressure control valve such as an electromagnetic proportional pressure reducing valve for creating pressure in a working fluid cylinder against inertial force of rolling motion of a vehicle. Therefore, a great supply flow rate is necessary which is provided by a pressure source including a hydraulic pump and a reservoir tank for supplying high energy to the working fluid cylinders, resulting in great consumption energy. It will be noted that a vehicle incorporating a conventional active suspension control system consumes more fuel than a vehicle without an active suspension control system due to the additional energy consumed for anti-rolling motion control. Accordingly, an improved active suspension control system which conducts the same level of control as that of the conventional system, but with reduced energy consumption, has been sought.

SUMMARY OF THE INVENTION

It is therefore a principal object of the present invention to avoid the disadvantages of the prior art.

It is another object of the invention to provide a working fluid circuit for an active suspension control system which is effectively operable with reduced necessary energy to be supplied by a pressure source, without degrading active suspension operation.

According to one aspect of the present invention, there is provided a working fluid circuit for an active suspension control system for a vehicle which comprises a pressure source providing pressurized working fluid to actuators associated with wheels respectively, which actuators are operable to suppress attitude change of a vehicle body, pressure control valves controlling pressure of the working fluid supplied by the pressure source to the actuators respectively, each having a supply port communicating with the pressure source through a supply line through which the working fluid is supplied from the pressure source to the pressure control valve and an output port communicating with the actuator through an output line through which the working fluid, adjusted at a preselected controlled level, is output to the actuator, and valve means associated with the pressure control valves respectively, each being responsive to pressure of the working fluid in the output line which is greater than that in the supply line to feedback the working fluid in the output line to the supply line for providing pressure as a part of supply pressure to said pressure control valves.

In the preferred mode, the valve means includes by-pass lines each of which communicates between the output line and the supply line connected to the pressure control valve and check valves disposed in the by-pass lines respectively.

Additionally, the valve means may further include throttles each arranged in the by-pass line in series with the check valve for restricting working fluid of a pressure above a preselected pressure level from flowing to the supply line connected to the pressure control valve.

With the above arrangement, when, for example, the inside wheels travel over a rough shoulder or road protrusion, during turning, vibration is input and a working pressure for the inside wheels (i.e., pressure of the output port of the pressure control valve or controlled pressure) is elevated above a supply pressure. The valve means is opened to allow the working fluid to flow from the output line to the supply line through the by-pass line. This raises pressure of the working fluid supplied to the pressure control valve. It will be thus noted that vibrational energy caused by the protrusions of the road surface is converted into fluid energy to add to the supply pressure to the supply port of the pressure control valve for recovering reduction in supply pressure for use in anti-rolling control necessary due to energy consumption of the outside wheels. Therefore, the supply pressure provided by the pressure source may be decreased by the recovered pressure.

DESCRIPTION OF THE PREFERRED EMBODIMENT

Figure 1:
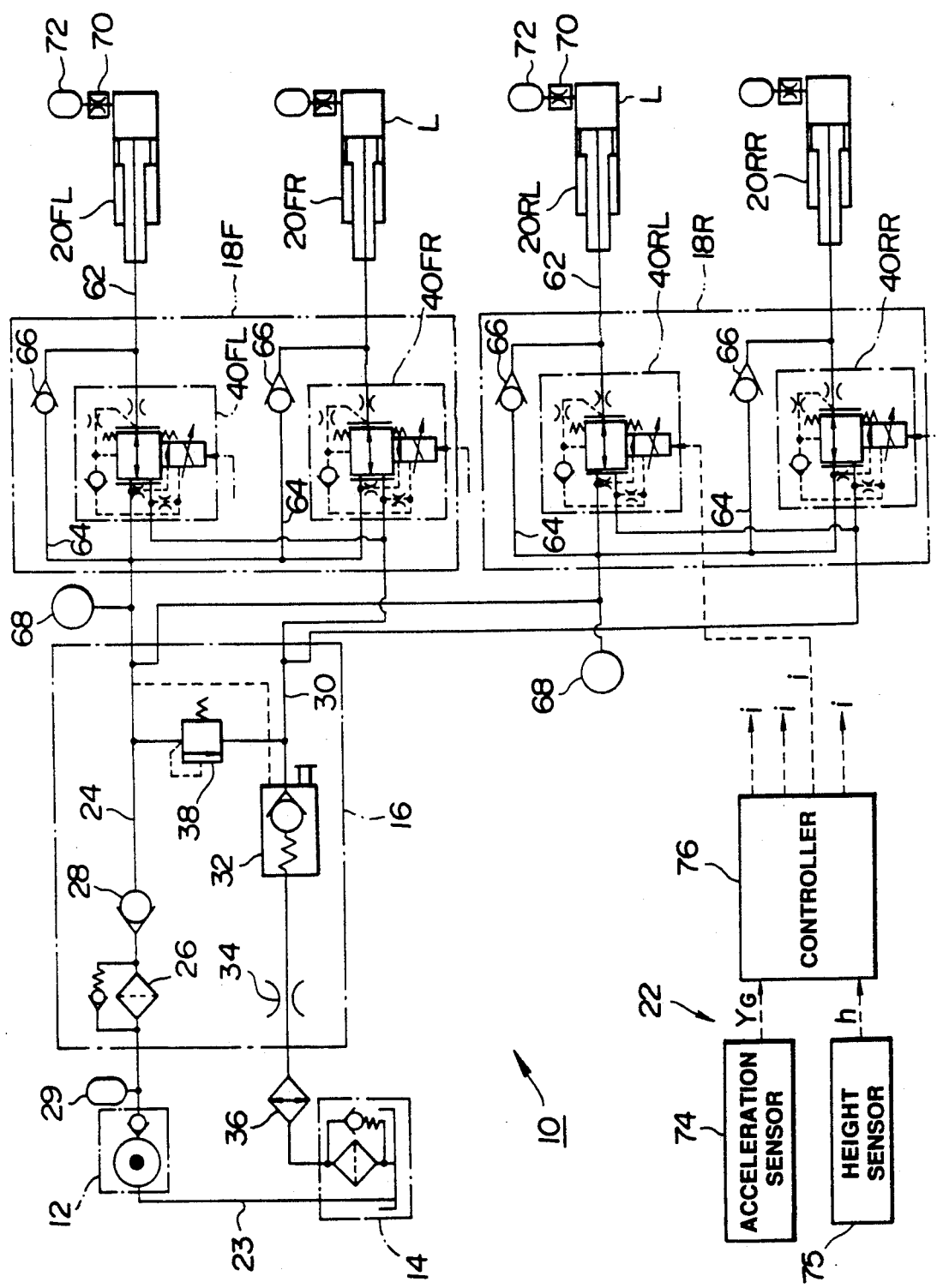
FIG. 1 is an illustration which shows an active suspension control system according to the present invention.

Referring now to the drawings, particularly to FIG. 1, an active suspension control system 10 for use in an automotive vehicle according to the present invention is shown. This system 10 generally includes a hydraulic pump 12 and reservoir tank 14 as a pressure source, a multi-valve assembly 16, a front pressure control valve assembly 18F for front wheels, a rear pressure control valve assembly 18R for rear wheels, actuators or hydraulic cylinders 20FL to 20RR, and a control unit 22 which provides control command signals for suppressing vehicle attitude change.

The pressure source provides pressurized working fluid such as hydraulic fluid to the multi-valve assembly 16. The multi-valve assembly 16 then supplies the hydraulic fluid to the front and rear pressure control valve assemblies 18F and 18R to control pressure to be supplied to the hydraulic cylinders 20FL to 20RR for active suspension control.

The hydraulic pump 12 includes a plunger type pump for example which is driven by rotational output from a vehicle engine. A inlet port of the pump 12 is communicated with the reservoir tank through a pressure line 23 and an outlet port thereof is communicated with a supply line 24 which connects an oil filter 26 and a check valve 28 serially. The check valve 28 restricts working fluid flow from backing-up to the hydraulic pump 12. The supply line 24 branches from the multi-valve assembly 16. The branched lines are communicated with the front and rear pressure control valve assemblies 18F and 18R respectively. In addition, a pump accumulator 29 is provided in the supply line 24.

Return lines 30 extend from the pressure control assemblies 18F and 18R and merge at the multi-valve assembly 16 for communicating with an operational check valve 32 and a throttle 34 serially. The merged return line 30 is then connected to the reservoir tank 14 through an oil cooler 36.

The operational check valve 32 is designed as a pilot-operated check valve to which supply pressure output from the check valve 28 is fed as pilot pressure Pp. This check valve 32 is operable to maintain an open position when the pilot pressure Pp is greater than a preselected level, such as neutral pressure, and to assume a closed position in response to a pilot pressure Pp less than the preselected level. With this arrangement, closing of the operational check valve 32 due to engine stop causes line pressure in a hydraulic circuit upstream from the operational check valve 32 to be held at the preselected level.

The multi-valve assembly 16 includes a relief valve 38 which has been set to a preselected relief pressure and is disposed between the check valve 28 and the operational check valve 38 to connect the supply line 24 downstream from the check valve and the return line 30.

The supply line 24 introduced into the front pressure control valve assembly 18F branches to be communicated with supply ports of front-left and front-right pressure control valves 40FL and 40FR as described hereinafter in detail. Return lines connected to return ports of the pressure control valves 40FL and 40FR, are merged to define the return line 30 which then extends to the multi-valve assembly 16. Additionally, the rear pressure control valve assembly 18R includes pressure control valves 40RL and 40RR and a line network thereof is comparable with the front pressure control valve assembly 18F, therefore, its arrangement will not described in detail here.

Figure 2:
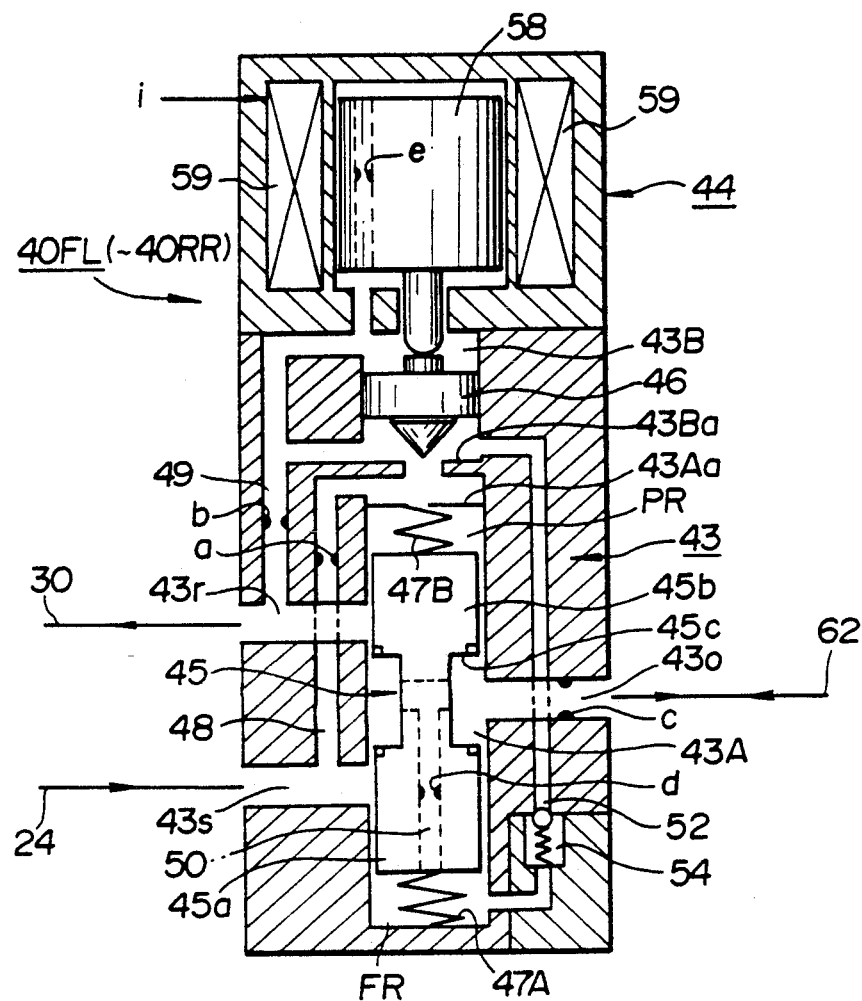
FIG. 2 is a sectional view which shows a structure of a pressure control valve for use in an active suspension control system.

Referring to FIG. 2, one example of the pressure control valves 40FL to 40RR is shown. This pressure control valve generally includes a cylindrical valve housing 43 incorporating a valve body and a proportional solenoid 44 integrally provided in the valve housing.

The valve housing 43 includes a cylindrical valve bore 43A at its center portion in which a main spool 45 is slidably disposed, and, a pilot valve bore 43B which is formed at a longitudinal end portion of the valve bore 43A coaxially therewith. A poppet is slidably disposed in the pilot valve bore 43B as a pilot valve. In both ends of the main spool 45, a feed-back chamber FR and a pilot chamber PR are defined respectively. Springs 47A and 47B are arranged in the chambers FR and PR respectively which serve to center the spool 45 in the valve bore 43A. A throttle 43Aa is provided by a support disposing the upper spring 47B for restricting a flow rate of the working fluid passing through the pilot chamber PR and the pilot valve bore 43B.

The valve housing 43 further includes a supply port 43s, a return port 43r, and an outlet port 43o which are communicated with the valve bore 43A and disposed so as to face toward lands 45a and 45b of the main spool 45 and a pressure chamber 45c respectively. A valve seat 43Ba which defines an opening having a preselected diameter is provided, in the pilot valve bore 43B, opposite a tip portion of the poppet 46.

The supply port 43s is communicated with the pilot valve bore 43B via a supply side passage 48. The return port 43r is also communicated with the pilot valve bore 43B through a return side passage 49. With these passages, the working fluid from the supply port 43s is partly circulated to the return port 43r through the passage 48, the valve seat 43Ba, the passage 49. During this circulation, the return side passage is communicated with the pilot valve bore 43B at both ends of the poppet 46 and also communicated with the inside of the proportional solenoid 44.

The output port 43o is communicated with the feed-back chamber FR through a feed-back passage 50. Between the feed-back chamber FR and a portion below the poppet 46, as viewed from the drawing, in the pilot valve bore 43B, a by-pass passage 52 is formed which bypasses the spool valve bore 43A. Disposed in the by-pass passage 52 is a check valve 54 which serves to allow the working fluid to flow from the spool valve passage 43A to the feed-back chamber FR.

The proportional solenoid 44 includes an axially slidable plunger 58 and an exciting coil 59 for moving the plunger 58 in an axial direction of the valve 44. The exciting coil 59 is responsive to a command signal or current i to be excited for moving the plunger 58, urging the poppet 46 to contact with the valve seat 43B. The degree of displacement of the poppet toward the valve seat 43B determines a flow rate of the working fluid through the valve seat 43B for adjusting pressure in the pilot chamber PR to a preselected level. Characters a-e in the drawing indicate throttles.

Figure 3:
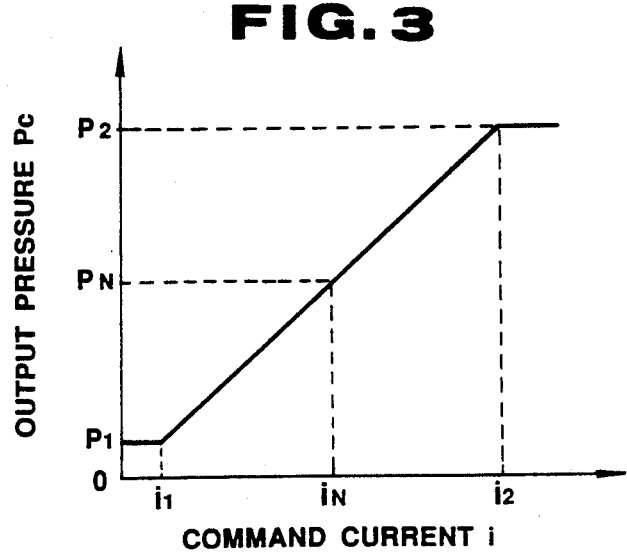
FIG. 3 is a graph which shows the relationship between output pressure of a pressure control valve and a command signal or current applied thereto.

It is noted that when the pressures in the feed-back chamber FR and the pilot chamber PR are balanced under the condition that thrust from the proportional solenoid 44 acts on the poppet 46, the spool 45 takes an overlapping position (shown in FIG. 2) for blocking communication between the output port 43o and the supply port 43s. The pressure in the pilot chamber PR (i.e., the pilot pressure) is modified according to the magnitude of the command current i. The spool 45 then vibrates slightly until the pilot pressure and the pressure in the feed-back chamber FR are balanced with each other. This controls an output pressure Pc (control pressure) from the output port 43o proportionally to the magnitude of the command current i as shown in FIG. 3. In FIG. 3, $P_2$ designates a maximum line pressure to be supplied.

In a case where a vibration of a low frequency in a spring resonance region (for example, around 1 Hz) is transmitted from a road surface, the spool 45 can be slightly displaced so that the working fluid reciprocates between the hydraulic pressure source and a load side to absorb vibration in pressure within a preselected range.

The output ports 43o of the pressure control valves 40FL-40RR are respectively connected with output lines 62, and the output ports 43o are communicated with the cylinder chambers of the hydraulic cylinders 20FL-20RR by the output lines 62 as shown in FIG. 1.

Further, the front and rear pressure control valve assemblies 18F and 18R of this embodiment include by-pass lines 64 which connect between the output lines 62 and the supply lines 24 by-passing the pressure control valves 40FL-40RR respectively. Junctions of the by-pass lines 64 and the output lines 62 are arranged close to the hydraulic cylinders with respect to the throttles c of the output ports 43o.

Each by-pass line 64 includes a check valve 66 which serves as a passage open and close mechanism which is responsive to a preselected pressure level in the output line 62 to feed back the working fluid in the output line 26 to the supply line 24. In FIG. 1, front and rear accumulators 68 are provided in the supply lines 24 extending to the front and rear pressure control valve assemblies 18F and 18R.

The hydraulic cylinders 20FL-20RR serving as actuators are provided with single acting cylinders each disposed between a wheel and a vehicle body. This cylinder includes a cylinder chamber L into which working fluid pressure is adjusted by the pressure control valve through which its pressure is supplied. The cylinder chamber L is communicated with a throttle 70 and an accumulator 72 which serve to absorb variation in pressure in a sprung resonance range. Additionally, coil springs (not shown) are interposed between the wheels and the vehicle body respectively for supporting a static load of the vehicle body.

The control unit 22 includes generally a lateral acceleration sensor 74, a vehicle height sensor 75, and a controller 76. The controller 76 incorporates a microcomputer and is responsive to a signal $Y_G$ representing a lateral acceleration acting on the vehicle body, input from the lateral acceleration sensor 74 to multiply it by a preselected anti-roll control gain to calculate command currents i to be output to the pressure control valves 40FL-40RR associated with the wheels respectively. The controller 76 is further responsive to a signal h indicating a vehicle height monitored by the vehicle height sensor 75 to provide command currents so that the vehicle body is maintained at a level orientation within a target vehicle height range. These command currents are interposed in the command currents i which are, in turn, output to the pressure control valves 40FL-40RR as active suspension control signals.

In operation, assuming that a vehicle is running straight at a constant speed with a standard load, the lateral acceleration sensor 74 provides a signal $Y_G$ of zero which indicates no acceleration acting on the vehicle body. The controller 76 is then responsive to signals h from the vehicle height sensor 75 to provide the command signals i (e.g., a value $i_N$ corresponding to the neutral pressure $P_N$ shown in FIG. 3) to the pressure control valves 40FL-40RR respectively for maintaining a vehicle height level within the target height range. The pressure control valves 40FL-40RR are responsive to the command signals i to control pressures to be supplied to the hydraulic cylinders 20FL-20RR, establishing cylinder pressures equal to $P_N$. As a result, a cylinder stroke of the hydraulic cylinder is set according to the cylinder pressure $P_N$ to maintain the vehicle body at a flat level orientation within the target height range.

When the vehicle is turned to the left from a straight running status, the vehicle body tends to roll and the lateral acceleration sensor 74 detects lateral acceleration acting on the vehicle body to provide a signal $Y_G$ indicating the magnitude of the lateral acceleration. The controller 76 then increases command currents i to be supplied to the pressure control valves 40FR and 40RR associated with the right wheels which are the outside wheels, in accordance with a value $Y_G$ of the lateral acceleration, while it decreases command currents i to be supplied to the pressure control valves 40FL and 40RL. Thus, the cylinder pressures of the hydraulic cylinders 18FR and 18RR for the outside wheels are elevated from the present neutral pressure $P_N$ for example, while the cylinder pressures of the hydraulic cylinders 18FL and 18RL for the inside wheels are reduced from the neutral pressure $P_N$, causing force in the hydraulic cylinders 18FR and 18RR to be created against lowering motion due to an inertial force of the vehicle body. Cylinder pressures of the hydraulic cylinders 18FL and 18RL for the inside wheels are reduced to provide pressures which do not promote rolling motion. It will be appreciated that anti-rolling control is effected in the vehicle body to restrict the rolling motion for maintaining vehicle attitude on the horizontal plane.

Figure 4:
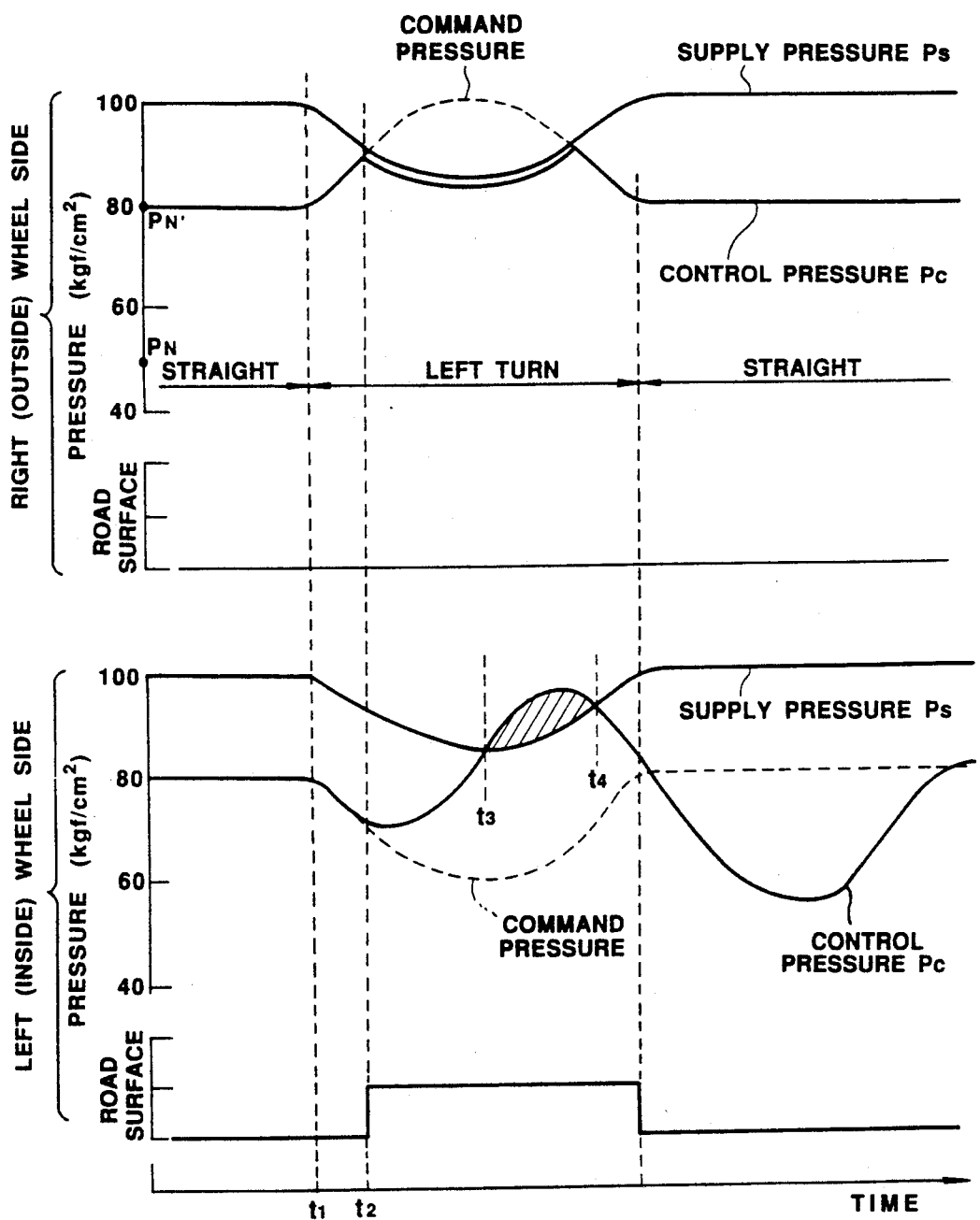
FIG. 4 is graph which shows timing charts representing relations between supply pressures and control pressures for right and left wheels respectively in a conventional active suspension control system.

Conventionally, assuming that the vehicle with a heavy load is running straight on an even road at a constant speed, due to the increase in a load, the vehicle height level is lowered, thus, the controller 76 effects vehicle height control to increase a control pressure $P_C$ (for example, 80 kgf/cm$^2$=$P_N'$ as shown in FIG. 4), when vehicle attitude or anti-rolling motion control is not carried out, toward a level which is higher than the above-described control pressure $P_C$ (for example, 50 kgf/cm$^2$=$P_N$) in the case of a standard load, resulting in a pressure difference relative to the supply pressure $P_S$ (for example, 100 kgf/cm$^2$ as shown in FIG. 4) being reduced so that the degree of pressure control to outer wheels may become small or inadequate.

In order to clarify the object of the present invention, pressure variation, when the vehicle is heavily loaded, in a conventional system without the bypass lines 64 with the check valves 66 for each of the pressure control valves 40FL-40RR, will be described hereinbelow referring to FIG. 4.

If a vehicle is running straight with a heavy load in the same manner as described above. Although a high control pressure $P_C$ (=80 kgf/cm$^2$) is utilized as a neutral pressure $P_N'$ when the vehicle is running straight, the controller 76 adjusts the vehicle body to be maintained at a level of a target vehicle height. When the vehicle is temporarily turned to the left while running straight, by the above described rolling control, control pressures $P_C$ (i.e., cylinder pressures) of the hydraulic cylinders 40FR and 40RR for the outside wheels rise as shown in FIG. 4, while control pressures $P_C$ of the hydraulic cylinders 40FL and 40RL for the inside wheels are made to be reduced.

However, referring to FIG. 4, due to supply of working fluid to the hydraulic cylinders for the outside wheels, the supply pressure $P_S$ begins to be reduced after a time $t_1$. Thus, after a time $t_2$ when the supply pressure $P_S$ coincides with the control pressure $P_C$, a control pressure does not correspond to a command pressure (which is shown by a broken line in FIG. 4). The control pressure $P_C$ is lowered in line with the supply pressure $P_S$.

On the other hand, a command for decreasing the control pressure $P_C$ for the left or inside wheels is output after the time $t_1$ as shown by broken line. Between the time $t1$ and time $t_2$, control pressure $P_C$ is varied according to the decrease of the supply pressure $P_S$.

During the rolling motion control beginning at the time $t1$, if a vehicle travels over a protrusion in a road surface and vibration of relatively large amplitude caused thereby is input only to the inside wheels (the left wheels) at the time $t_2$ or a time close to $t_2$, the working fluid in the cylinder chamber L is compressed to cause an internal pressure of the cylinder chamber L to increase over a command pressure as shown in the drawing.

It will be noted that when large vibration is inputted to the hydraulic cylinder, caused by traveling over a large protrusion or traveling at a high speed, the control pressure $P_C$ for the left wheels becomes higher than the supply pressure $P_S$ between a time $t_3$ and $t_4$ as shown by a hatched region in FIG. 4. In other words, vibrational energy transmitted from a road surface is converted into hydraulic energy, causing the control pressure $P_C$ to elevate above the supply pressure $P_S$ ($P_C > P_S$). Accordingly, it will be appreciated that hydraulic energy necessary to be generated by the suspension system of a vehicle itself can be reduced by utilizing vibrational energy transmitted from a road surface effectively.

Figure 5:
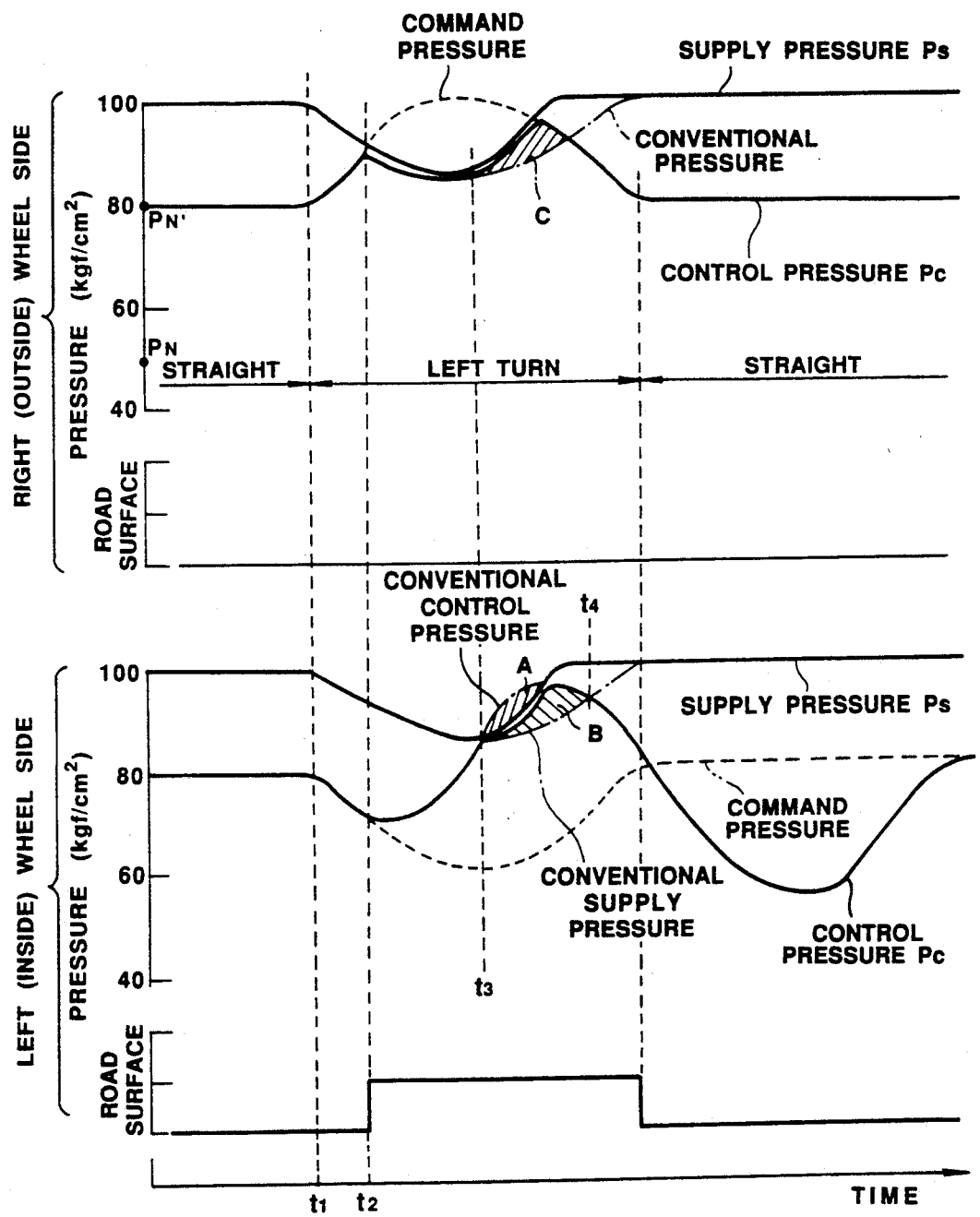
FIG. 5 is a graph which shows timing charts representing relations between supply pressures and control pressures for right and left wheels respectively in the present active suspension control system.

Referring to FIG. 5, pressure variation according to the system of the invention under the same conditions as described above (a heavy load, a left turn, and traveling over a protrusion in a road surface by left wheels) is shown.

When the left wheel (inside wheel) travels over a protrusion of a road surface at a time $t_1$, vibrational energy is input to the hydraulic cylinder to increase control pressure $P_C$ for the left wheel. At a time $t_2$ when the control pressure $P_C$ is greater than supply pressure $P_S$ at a time $t_3$ as shown in FIG. 5, the check valve 66, for example, is opened, which by-passes the pressure control valve 40FL for the front-left wheel, allowing the working fluid in the cylinder chamber L and in the output line communicated with the cylinder chamber L to be returned to the supply port 43s through the check valve 66. This results in the supply pressure $P_S$ starting to elevate.

Upon the supply pressure $P_S$ being elevated, it is utilized for suppressing rolling motion at the right wheels. Therefore, the supply pressure $P_S$ varies according to a curve, as shown in FIG. 5, which extends through the middle of the excess portion of the curve indicating the control pressure $P_C$ over the supply pressure $P_S$.

It will be appreciated that hydraulic energy converted from vibrational input to the left wheels which corresponds to the hatched region A is transferred for control of the right wheels so that control pressure $P_C$ is elevated from a pressure level in a conventional system by energy corresponding to the hatched region C (= to the hatched region A). Accordingly, an insufficiency of control pressure $P_C$ relative to a target pressure becomes less than that of the supply pressure of a conventional system, which is shown by one-dotted-chain-line, enhancing anti-rolling motion control. In contrast, control pressure $P_C$ for the left wheels is lowered from a conventional control pressure by a degree defined by the hatched region A (= the hatched region C).

As mentioned above, the present invention is directed to a simple structure which incorporates the bypass line 64 and the check valve 66 into a conventional active suspension control system. With this structure, hydraulic energy corresponding to hatched regions "A + B" in FIG. 5 can be utilized effectively. Actual control pressures $P_C$ for either the right or left wheels are provided which are close to desirable pressure levels aimed by the controller 76. This results in improved favorable control characteristics.

It can be said from a different viewpoint that the same control performance as that of the conventional active suspension control system can be secured even when supply flow (rated flow) provided by the hydraulic pump 12 is somewhat reduced. Therefore, hydraulic energy to be supplied the pump to the hydraulic circuit can be reduced by a degree of increase in hydraulic energy generated by road surface vibrational input, thus improving fuel consumption. It will be appreciated that the suspension of the present invention can be easily applied to the conventional systems with low manufacturing cost.

As shown in FIGS. 4 and 5, control pressure $P_C$ for the left wheel is oscillated by rebounding motion caused after the wheel has passed over a road protrusion.

In the system of the invention, when vibrational energy input is extremely high and supply pressure $P_S$ exceeds a preselected set pressure level of the relief valve 38 due to energy conversion from the vibrational energy input, working fluid or hydraulic fluid, an amount of which corresponds to the excess of the supply pressure $P_S$, is returned to the reservoir tank 14 through the relief valve 38 since location of the relief valve is close to the load side, thereby restricting the maximum value of supply pressure $P_S$ generated by the energy conversion, preventing the pressure control valves 40FL to 40RR from being damaged.

Although in this embodiment, a typical example has been described in which only the inside wheels run over protrusions during anti-rolling control, it can been seen easily that when the outside wheels run over protrusions simultaneously with the inside wheels, an insufficiency of supply energy is covered in the same manner as already mentioned so that vibrational energy from a road surface is converted effectively into hydraulic energy.

Figure 6:
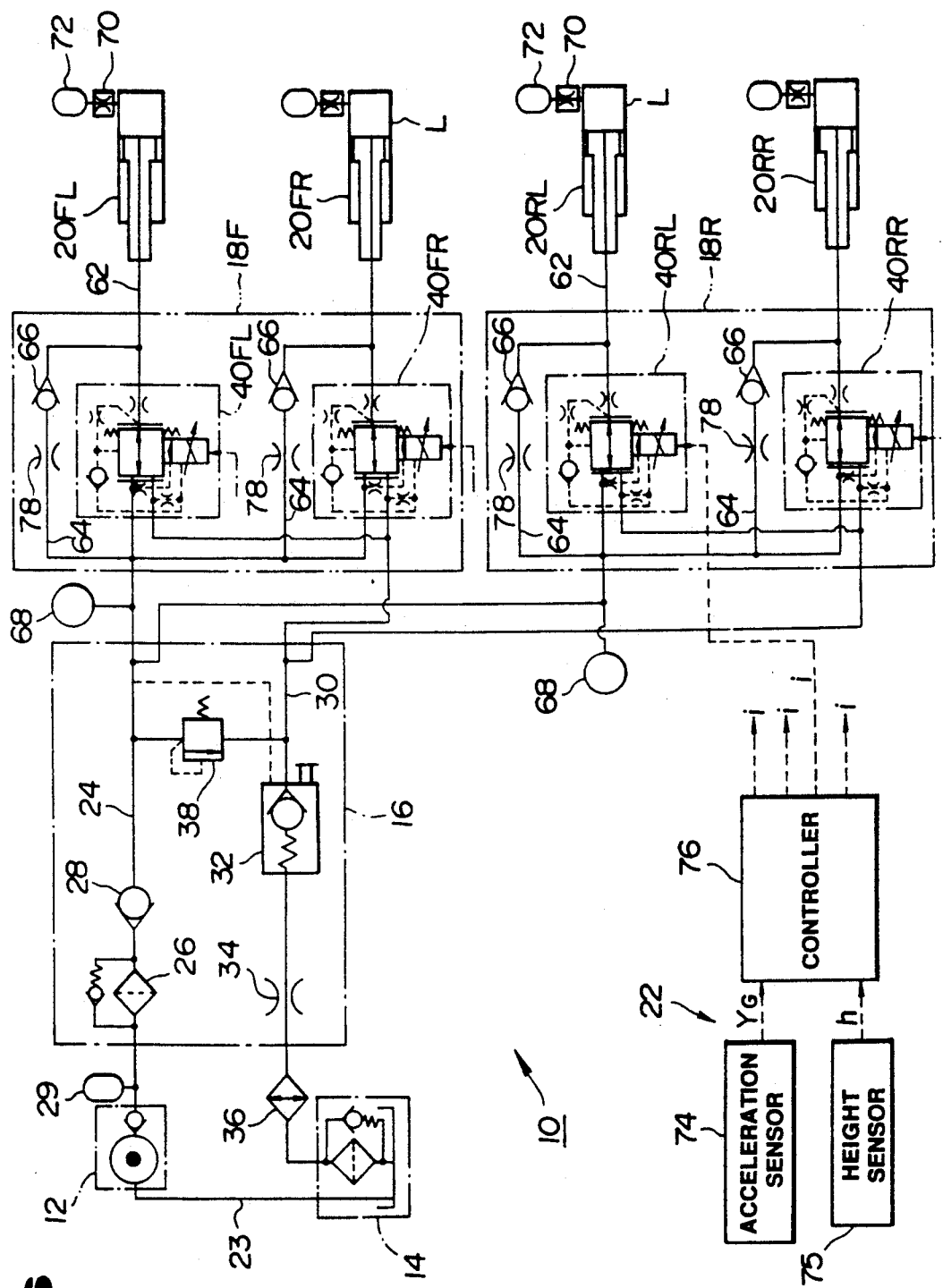
FIG. 6 is a block diagram which shows an alternate embodiment of an active suspension control system of the invention.

Referring to FIG. 6, an alternative embodiment is shown. This embodiment includes throttles or orifices 78 each disposed in a by-pass line 64 upstream from a check valve 66 in a serial relation thereto. Other arrangements are the same as those of the above described first embodiment. As to elements common to the embodiment shown in FIG. 1, like numbers refer to like parts and description thereof will be omitted.

According to this embodiment, the same working effect as that described before can be obtained. Further, when excessive high energy is inputted from a road surface, a sharp variation in supply pressure caused by the energy conversion is restricted by the orifice 78 to a preselected pressure level for preventing the working fluid of pressure above a preselected level from flowing to the supply line for advantageously establishing further stable operation of a pressure control valve.

The above embodiments include the by-pass lines 64 and the check valves 66 which are provided separately from the pressure control valves 40FL to 40RR respectively. However, these arrangements may be integrally provided within the pressure control valves.

Additionally, the flow passage opening and closing mechanism may be provided with a pressure sensor and an electromagnetic directional control valve in place of the check valve 66. With these arrangements, the pressure sensor monitors supply and cylinder pressures to provide signals indicative thereof to the controller 76. The controller compares the magnitude of these pressure levels to control the directional control valve according to the result of comparison for opening and closing the by-pass line 64.

Further, the above described active suspension control system may utilize a gas, such as air, as a working fluid in place of hydraulic fluid.

As already mentioned, a by-pass passage is provided which communicates a supply port with an output port of a pressure control valve under the condition that a spool is by-passed by the by-pass passage, wherein the by-pass passage is provided with a passage opening and closing mechanism such as a check valve which allows hydraulic fluid to flow from the output port to the supply port when pressure (control pressure) of the output port is greater than pressure (supply pressure) of the supply port. Accordingly, for example, when supply pressure is greatly lowered and high vibration or high amplitude input is given from a road surface under the condition that the vehicle is turned, the control pressure exceeds the supply pressure, and hydraulic fluid passes through the by-pass passage so that it can be sent to a supply line. This increases the supply pressure and rolling control effect can be improved, so that vibrational energy given from a road surface can be converted into fluid energy effectively to add pressure to the supply port of the pressure control valve for covering reduction in supply pressure for use in anti-rolling control caused by energy consumption for outside wheels. The supply pressure provided by a hydraulic pressure source may be decreased by the covered pressure. As a result, the capacity of the hydraulic pressure source may be reduced as compared with a conventional system, so that energy consumption of the vehicle can be reduced with improvement in active suspension control.

What is claimed is:

1. A working fluid circuit for an active suspension control system for a wheeled vehicle at least three wheels, comprising:
 a plurality of actuators cooperating with respective wheels of the vehicle for suppressing an attitude change of the vehicle body;
 a pressure source for providing a pressurized working fluid to said actuators;
 a plurality of pressure control valves for respectively controlling a pressure of the working fluid supplied by said pressure source to each of said actuators, each pressure control valve having a supply port and an output port;
 a plurality of supply lines connecting said pressure source and respective supply ports of said pressure control valves for supplying pressurized working fluid from said pressure source to corresponding pressure control valves, said supply lines being in fluid unrestricted communication with each other;
 a plurality of output lines connecting between respective output ports of said pressure control valves and corresponding actuators for adjusting the working fluid in each of said actuators at preselected controlled levels; and
 valve means comprising respective single check valves connecting each of said supply lines and said output lines, each of said single check valves being provided in parallel to a respective one of said pressure control valves, said single check valves each acting when a pressure of the working fluid in the output line connected to said respective pressure control valve exceeds a pressure in the supply line connected to said respective pressure control valve to feed back working fluid from the output line connected to said respective pressure control valve to the supply line connected to said respective pressure control valve to thereby supplement the supply pressure of the working fluid provided via said unrestrictedly communicating supply lines to all of said pressure control valves.

2. A circuit as set forth in claim 1, wherein said valve means includes by-pass lines each of which communicates between the output line and the supply line connected to the pressure control valve and check valves disposed in the by-pass lines respectively.

3. A circuit as set forth in claim 2, wherein said valve means further includes throttles each arranged in the by-pass line in series with the check valve for restricting working fluid above a preselected pressure level from flowing to the supply line connected to the pressure control valve.

4. A circuit as set forth in claim 1, wherein each of said pressure control valves is connected to said pressure source through a return line for returning the working fluid to said pressure source, a check valve being disposed in the supply line which restricts working fluid flow from returning to said pressure source and a relief valve which communicates between the supply line downstream from the check valve and the return line, the relief valve being responsive to pressure of the working fluid in the supply line which is greater than a preselected pressure level to allow the working fluid to flow to said pressure source through the return line.

5. A circuit as set forth in claim 1, wherein each of said pressure control valves includes a spool, pilot pressure being supplied to an end of the spool, the controlled pressure output from the output port being fed back to the other end of the spool, said pressure control valve being responsive to the pilot pressure to adjust a pressure level of the working fluid supplied from said pressure source.

* * * * *